US 9,046,161 B2

(12) United States Patent
Takikawa et al.

(10) Patent No.: US 9,046,161 B2
(45) Date of Patent: Jun. 2, 2015

(54) STARTING APPARATUS

(75) Inventors: Yoshihiro Takikawa, Tsushima (JP);
Kazuto Maruyama, Nishio (JP);
Kazuhiro Itou, Aujo (JP)

(73) Assignee: AISIN AW CO., LTD., Aichi-Ken (JP)

( * ) Notice: Subject to any disclaimer, the term of this patent is extended or adjusted under 35 U.S.C. 154(b) by 286 days.

(21) Appl. No.: 13/233,637

(22) Filed: Sep. 15, 2011

(65) Prior Publication Data

US 2012/0080281 A1    Apr. 5, 2012

(30) Foreign Application Priority Data

Sep. 30, 2010  (JP) ................. 2010-222771

(51) Int. Cl.
*F16H 45/02* (2006.01)
*F16F 15/123* (2006.01)
*F16F 15/14* (2006.01)

(52) U.S. Cl.
CPC ........ *F16H 45/02* (2013.01); *F16H 2045/0205* (2013.01); *F16H 2045/0226* (2013.01); *F16H 2045/0231* (2013.01); *F16H 2045/0263* (2013.01); *F16H 2045/0294* (2013.01); *F16F 15/12366* (2013.01); *F16F 15/145* (2013.01)

(58) Field of Classification Search
USPC ........ 192/55.61, 30 V, 213.2, 3.28; 74/574.2; 464/64.1
See application file for complete search history.

(56) References Cited

U.S. PATENT DOCUMENTS

| | | | |
|---|---|---|---|
| 6,026,940 A * | 2/2000 | Sudau | 192/3.28 |
| 6,688,441 B1 | 2/2004 | Arhab et al. | |
| 8,161,739 B2 | 4/2012 | Degler et al. | |
| 8,161,740 B2 | 4/2012 | Krause et al. | |
| 8,342,306 B2 | 1/2013 | Werner et al. | |
| 8,403,762 B2 | 3/2013 | Steinberger | |
| 2004/0226794 A1 | 11/2004 | Sasse et al. | |
| 2009/0125202 A1 | 5/2009 | Swank et al. | |
| 2010/0236228 A1 | 9/2010 | Degler et al. | |
| 2011/0031083 A1 | 2/2011 | Matsuoka et al. | |

(Continued)

FOREIGN PATENT DOCUMENTS

| | | |
|---|---|---|
| DE | 10 2009 042 837 A1 | 4/2010 |
| DE | 10 2009 002 481 A1 | 6/2010 |

(Continued)

OTHER PUBLICATIONS

International Search Report for corresponding International Patent Application No. PCT/JP2011/071368 mailed Dec. 20, 2011.

(Continued)

*Primary Examiner* — Robert Hodge
*Assistant Examiner* — Ryan Dodd
(74) *Attorney, Agent, or Firm* — Sughrue Mion, PLLC

(57) ABSTRACT

A starting apparatus including an input member coupled to a motor; a damper mechanism having an input element, an elastic body and an output element; a lock-up clutch mechanism for performing lockup where the input member is coupled to an input shaft of a transmission via the damper mechanism and for canceling lockup, and a dynamic damper including an elastic body and a mass body engaged with the elastic body. The mass body of the dynamic damper is an elastic body support member that is supported rotatably around an axis of the starting apparatus and that supports the elastic body of the damper mechanism. With this arrangement, the dynamic damper is easily adjustable while reducing the overall size of the starting apparatus.

20 Claims, 10 Drawing Sheets

(56) References Cited

U.S. PATENT DOCUMENTS

| | | | |
|---|---|---|---|
| 2011/0192692 A1* | 8/2011 | Werner et al. | 192/3.29 |
| 2011/0240429 A1 | 10/2011 | Heuler et al. | |
| 2012/0080280 A1* | 4/2012 | Takikawa et al. | 192/3.28 |
| 2012/0080281 A1 | 4/2012 | Takikawa et al. | |
| 2012/0080282 A1* | 4/2012 | Takikawa et al. | 192/3.28 |
| 2012/0111683 A1* | 5/2012 | Ito et al. | 192/3.28 |

FOREIGN PATENT DOCUMENTS

| | | |
|---|---|---|
| JP | 10169756 A | 6/1998 |
| JP | 2004-308904 A | 11/2004 |
| JP | 2009-115112 A | 5/2009 |
| JP | 2009156270 A | 7/2009 |
| JP | 2009-243536 A | 10/2009 |
| JP | 2009-293671 A | 12/2009 |
| WO | 2009/067987 A1 | 6/2009 |
| WO | 2009/067988 A1 | 6/2009 |
| WO | 2010/000220 A1 | 1/2010 |
| WO | 2010-043194 A1 | 4/2010 |
| WO | 2010/066665 A2 | 6/2010 |

OTHER PUBLICATIONS

International Search Report for corresponding International Patent Application No. PCT/JP2011/072282 mailed Dec. 13, 2011.
U.S. Appl. No. 13/200,752, filed by Kazuyoshi ITO on Sep. 30, 2011.
International Search Report for corresponding International Patent Application No. PCT/JP2011/071369 mailed Dec. 20, 2011.
U.S. Appl. No. 13/234,736, filed by Yoshihiro Takikawa on Sep. 16, 2011.
U.S. Appl. No. 13/222,712, filed by Yoshihiro Takikawa on Aug. 31, 2011.
International Search Report for corresponding International Patent Application No. JP2011/071455 mailed Dec. 27, 2011.

* cited by examiner

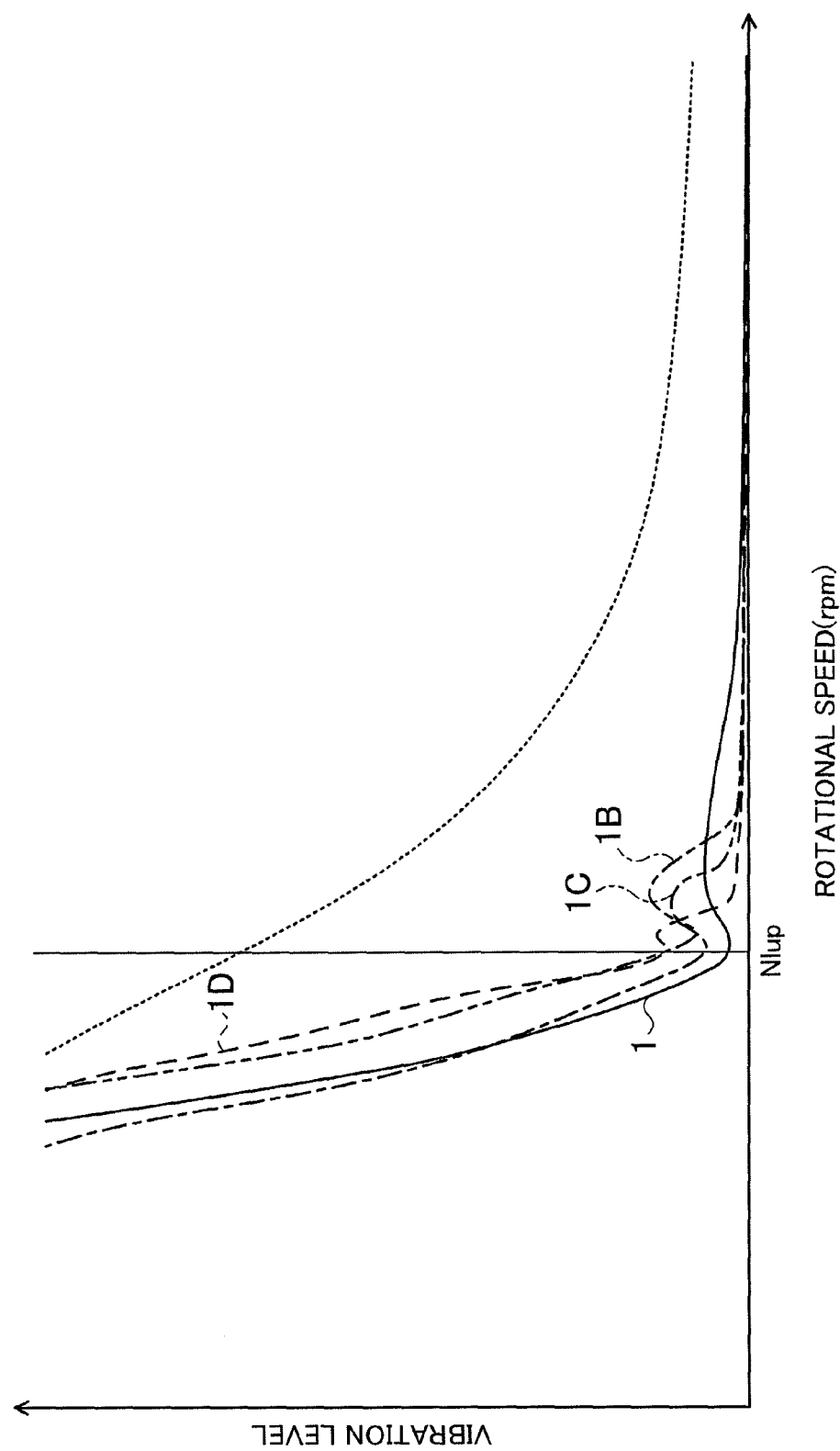

STARTING APPARATUS

INCORPORATION BY REFERENCE

The disclosure of Japanese Patent Application No. 2010-222771 filed on Sep. 30, 2010 including the specification, drawings and abstract is incorporated herein by reference in its entirety.

BACKGROUND OF THE INVENTION

The present invention relates to a starting apparatus that includes a dynamic damper.

DESCRIPTION OF THE RELATED ART

There has been suggested, as a conventional starting apparatus of this type, a fluid transmission apparatus which includes: a pump impeller that is connected to an input member coupled to a motor; a turbine runner that is rotatable together with the pump impeller; a damper mechanism that has an input element, an intermediate element engaged with the input element via first elastic bodies and an output element engaged with the intermediate element via second elastic bodies and coupled to an input shaft of a transmission; a lock-up clutch mechanism that is able to carry out lockup where the input member is engaged with the input element of the damper mechanism and that is able to cancel the lockup; and a dynamic damper that is formed of elastic bodies and the turbine runner engaged with the intermediate element of the damper mechanism via the elastic bodies (for example, see WO 2010/043194).

In addition, there has been known a conventional lock-up device for mechanically coupling an input rotor to an output rotor. The lock-up device includes a piston that is provided so as to be pressed against the input rotor by the action of hydraulic pressure, an output member that is coupled to the output rotor so as to be rotatable integrally with the output rotor, first elastic members for coupling the piston to the output member elastically in a rotational direction, an inertia member that is provided so as to be rotatable relative to the output member, and second elastic members for coupling the inertia member to the output member elastically in the rotational direction (for example, see Japanese Patent Application Publication No. 2009-293671). In the lock-up device, as the piston is pressed against the input rotor by the action of hydraulic pressure, power is transmitted from the input rotor to the output rotor via the piston and the output member. At this time, as fluctuations in rotational speed are input into the input rotor, the inertia member and the second elastic members function as a dynamic damper. Thus, the fluctuations in rotational speed are damped.

However, as in the case of the fluid transmission apparatus described in WO 2010/043194, when the turbine runner is used as the mass body of the dynamic damper, an increase in the size of the apparatus may be suppressed; however, it is not easy to adjust the characteristic of the dynamic damper by changing the size or weight of the turbine runner in terms of ensuring power transmission performance, and, in addition, there are also restrictions on changing the size or stiffness of the elastic body of the dynamic damper, so it is not always easy to obtain a favorable vibration damping effect brought by the dynamic damper. In addition, as in the case of the lock-up device described in Japanese Patent Application Publication No. 2009-293671, when the exclusive inertia member is used as the mass body of the dynamic damper, it is difficult to reduce the size of the device overall because of the necessity to ensure the arrangement space for the inertia member, and it is difficult to adjust the characteristic of the dynamic damper if it is reduction in size of the device overall is attempted.

SUMMARY OF THE INVENTION

It is a main object of the present invention to make, in a starting apparatus that includes a dynamic damper, the characteristic of the dynamic damper easily adjustable while reducing the size of the apparatus overall.

The starting apparatus according to the present invention employs the following means for achieving the above main object.

A starting apparatus according to an aspect of the present invention includes: an input member that is coupled to a motor; a damper mechanism that has an input element, an elastic body and an output element; a lock-up clutch mechanism that carries out lockup where the input member is coupled to an input shaft of a transmission via the damper mechanism and that is able to cancel the lockup; and a dynamic damper that includes an elastic body and a mass body engaged with the elastic body. In the starting apparatus, the mass body of the dynamic damper is an elastic body support member that is supported rotatably around an axis of the starting apparatus and that supports the elastic body of the damper mechanism.

In the starting apparatus, the elastic body support member that is supported rotatably around the axis of the starting apparatus and that supports the elastic body of the damper mechanism is used as the mass body of the dynamic damper. In this way, when the independent elastic body support member that supports the elastic body of the damper mechanism is supported rotatably around the axis of the starting apparatus and the elastic body support member is used also as the mass body of the dynamic damper, it is not necessary to use a mass body exclusive for the dynamic damper, so it is possible to reduce the size of the starting apparatus. In addition, the elastic body support member is an independent member and is not directly related to transmission of power unlike, for example, the turbine runner in the fluid transmission apparatus, so the elastic body support member is hard to be subjected to constraints of the size, weight, arrangement location, and the like. Thus, by using the elastic body support member as the mass body of the dynamic damper, it is possible to easily adjust the characteristic of the dynamic damper. As a result, in the starting apparatus, it is possible to easily adjust the characteristic of the dynamic damper while reducing the size of the apparatus overall.

In addition, the elastic body support member may be arranged in an outer peripheral side region inside a housing of the starting apparatus. Thus, the inertia of the elastic body support member may be increased, so an increase in the size or weight of the elastic body support member may be suppressed. Therefore, it is possible to reduce the size and weight of the starting apparatus.

Furthermore, the damper mechanism may have a plurality of elastic bodies, which are arranged so as to be spaced apart in a radial direction of the starting apparatus, and the elastic body support member may support the elastic body that is arranged on the radially most outer side among the plurality of elastic bodies. Thus, the inertia of the elastic body support member may be further increased.

In addition, the elastic body support member may be an annular member that is formed so as to slidably hold the elastic body of the damper mechanism, and the elastic body support member may be supported rotatably around the axis of the starting apparatus by the turbine runner. Thus, the elastic body of the damper mechanism may be supported by the elastic body support member in the region near the outer peripheral end of the turbine runner, which tends to be a dead space, so the inertia of the elastic body support member may be further increased, and the size of the starting apparatus overall may be reduced.

Furthermore, the damper mechanism may include a first elastic body engaged with the input element and a second elastic body arranged so as to be spaced apart from the first elastic body in a radial direction of the starting apparatus and engaged with the output element, and may include an intermediate element engaged with the first elastic body and the second elastic body, and the elastic body of the dynamic damper may be supported by the intermediate element, between the first elastic body and second elastic body of the damper mechanism when viewed in an axial direction of the starting apparatus. In this way, when the damper mechanism includes the intermediate element, by supporting the elastic body of the dynamic damper, between the first elastic body and second elastic body of the damper mechanism when viewed in the axial direction, members and spaces required for supporting the elastic body of the dynamic damper may be reduced. Thus, it is possible to further reduce the size of the starting apparatus overall.

Then, the starting apparatus may further include a centrifugal pendulum vibration absorber that includes a support member connected to the intermediate element or output element of the damper mechanism and a plurality of mass bodies each oscillatable with respect to the support member, the elastic body of the dynamic damper may be engaged with the output element of the damper mechanism, and the first and second elastic bodies of the damper mechanism and the elastic body of the dynamic damper may be arranged between the turbine runner and the centrifugal pendulum vibration absorber when viewed in the radial direction. In this way, by engaging the elastic body of the dynamic damper with the output element of the damper mechanism, the mass of the damper mechanism increases as a whole, and the resonant frequency of the damper mechanism decreases. Thus, the resonance point of the damper mechanism may be shifted toward a lower rotational speed away from the resonance point of the dynamic damper. Therefore, it is possible to further effectively damp vibrations transmitted from the motor to the input member with the dynamic damper in a range in which the rotational speed of the front cover (motor) is low. Furthermore, when the centrifugal pendulum vibration absorber is connected to the intermediate element of the damper mechanism, it is possible to further effectively suppress the resonance of the damper mechanism overall by suppressing, using the centrifugal pendulum vibration absorber, vibrations of the intermediate element that is interposed between the first elastic body and the second elastic body and, therefore, vibrates the most among the elements of the damper mechanism, so it is possible to suppress the resonance of the dynamic damper, that is, vibrations that occur as vibrations are damped by the dynamic damper. In addition, when the centrifugal pendulum vibration absorber is connected to the output element of the damper mechanism, it is possible to suppress the resonance of the dynamic damper, that is, vibrations that occur as vibrations are damped by the dynamic damper, with the centrifugal pendulum vibration absorber. Thus, with the above structure, vibrations transmitted to the input member may be further effectively damped by the dynamic damper and the centrifugal pendulum vibration absorber. In addition, by arranging the first and second elastic bodies of the damper mechanism and the elastic body of the dynamic damper between the turbine runner and the centrifugal pendulum vibration absorber when viewed in the radial direction of the starting apparatus, the arrangement space for the centrifugal pendulum vibration absorber is sufficiently ensured while suppressing an increase in the size of the starting apparatus to thereby make it possible to increase the flexibility of selection of the size (radial length) of each mass body of the centrifugal pendulum vibration absorber.

In addition, the starting apparatus may further include: a centrifugal pendulum vibration absorber that includes a support member connected to the intermediate element or output element of the damper mechanism and a plurality of mass bodies each oscillatable with respect to the support member, the elastic body of the dynamic damper may be engaged with the intermediate element of the damper mechanism, and the first and second elastic bodies of the damper mechanism and the elastic body of the dynamic damper may be arranged between the turbine runner and the centrifugal pendulum vibration absorber when viewed in the radial direction. In this way, by engaging the elastic body of the dynamic damper with the intermediate element of the damper mechanism, it is possible to further effectively suppress the resonance of the damper mechanism overall by suppressing vibrations of the intermediate element that is interposed between the first elastic body and the second elastic body and, therefore, vibrates the most among the elements of the damper mechanism. Furthermore, when the centrifugal pendulum vibration absorber is connected to the intermediate element of the damper mechanism, vibrations of the intermediate element of the damper mechanism are suppressed, and the resonance of the dynamic damper, that is, vibrations that occur as vibrations are damped by the dynamic damper, may be suppressed by the centrifugal pendulum vibration absorber. In addition, when the centrifugal pendulum vibration absorber is connected to the output element of the damper mechanism, it is possible to suppress the resonance of the dynamic damper, that is, vibrations that occur as vibrations are damped by the dynamic damper, with the centrifugal pendulum vibration absorber. Thus, with the above structure, vibrations transmitted to the input member may be further effectively damped by the dynamic damper and the centrifugal pendulum vibration absorber. In addition, by arranging the first and second elastic bodies of the damper mechanism and the elastic body of the dynamic damper between the turbine runner and the centrifugal pendulum vibration absorber when viewed in the radial direction of the starting apparatus, the arrangement space for the centrifugal pendulum vibration absorber is sufficiently ensured while suppressing an increase in the size of the starting apparatus to thereby make it possible to increase the flexibility of selection of the size (radial length) of each mass body of the centrifugal pendulum vibration absorber.

Furthermore, the intermediate element of the damper mechanism may have an axially extended portion that extends in the axial direction and that supports the elastic body of the dynamic damper, and that is contactable with the elastic body support member. Thus, it is possible to support the elastic body of the dynamic damper by the axially extended portion and to restrict movement of the elastic body support member in the axial direction.

In addition, the support member of the centrifugal pendulum vibration absorber may be fixed to the intermediate element or output element of the damper mechanism on the radially inner side of one of the first and second elastic bodies of the damper mechanism, the one of the first and second elastic bodies being arranged on the radially inner side among the first and second elastic bodies. Thus, a larger arrangement space for the centrifugal pendulum vibration absorber is ensured to thereby make it possible to further increase the flexibility of selection of the size (radial length) of each mass body of the centrifugal pendulum vibration absorber.

Then, the starting apparatus may be formed as a fluid transmission apparatus that further includes: a pump impeller that is connected to the input member; and a turbine runner that is rotatable together with the pump impeller.

BRIEF DESCRIPTION OF THE DRAWINGS

FIG. 10 is an explanatory graph that illustrates the correlation between the rotational speed of an engine, which serves as a motor, and the vibration level of each of the fluid transmission apparatuses 1, 1B, 1C and 1D.

DETAILED DESCRIPTION OF THE EMBODIMENTS

Next, a mode for carrying out the present invention will be described with reference to an embodiment.

Figure 1:
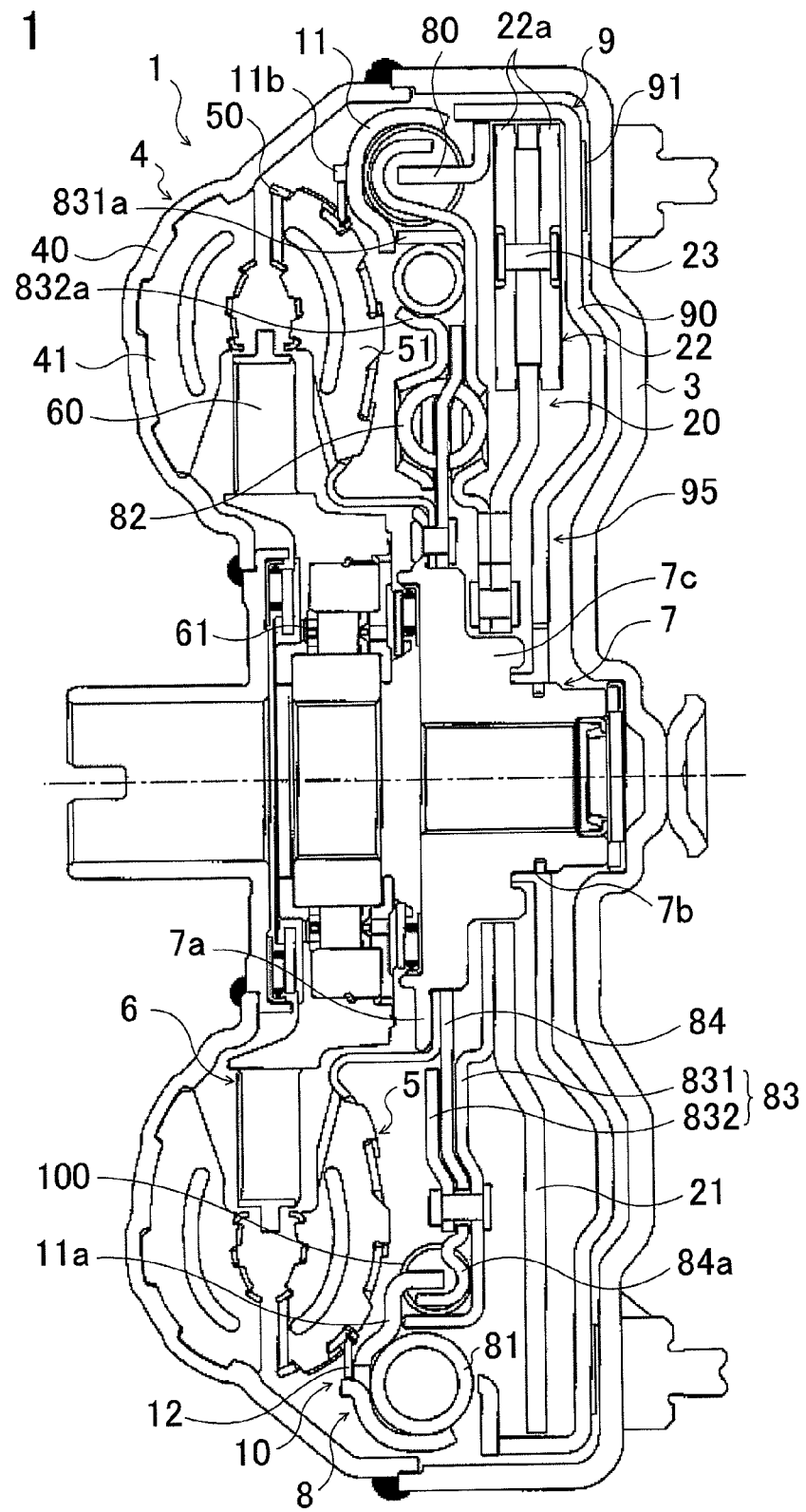
FIG. 1 is a structure diagram that shows a fluid transmission apparatus 1, which serves as a starting apparatus, according to one embodiment of the invention.

FIG. 1 is a structure diagram that shows a fluid transmission apparatus 1, which serves as a starting apparatus, according to one embodiment of the invention. The fluid transmission apparatus 1 shown in the drawing is a torque converter that is mounted as the starting apparatus on a vehicle equipped with an engine (internal combustion engine) that serves as a motor. The fluid transmission apparatus 1 includes a front cover (input member) 3 that is coupled to a crankshaft of the engine (not shown), a pump impeller (input-side fluid transmitting element) 4 that is fixed to the front cover 3, a turbine runner (output-side fluid transmitting element) 5 that is rotatable coaxially with the pump impeller 4, a stator 6 that rectifies the flow of hydraulic oil (hydraulic fluid) from the turbine runner 5 to the pump impeller 4, a damper hub (output member) 7 that is fixed to an input shaft of a transmission (not shown), which is an automatic transmission (AT) or a continuously variable transmission (CVT), a damper mechanism 8 that is connected to the damper hub 7, and a friction-type single disc lock-up clutch mechanism 9 that has a lock-up piston 90 connected to the damper mechanism 8.

The pump impeller 4 has a pump shell 40 that is airtightly fixed to the front cover 3 and a plurality of pump blades 41 that are arranged on the inner surface of the pump shell 40. The turbine runner 5 has a turbine shell 50 and a plurality of turbine blades 51 that are arranged on the inner surface of the turbine shell 50. The turbine shell 50 is fixed to a radially extended portion 7a that is formed at one end (left end in the drawing) of the damper hub 7 via rivets. The pump impeller 4 and the turbine runner 5 face each other. The stator 6 that is rotatable coaxially with the pump impeller 4 and the turbine runner 5 is arranged therebetween. The stator 6 has a plurality of stator blades 60. The rotational direction of the stator 6 is set in only one direction by a one-way clutch 61. These pump impeller 4, turbine runner 5 and stator 6 form a torus (annular flow passage) through which hydraulic oil circulates.

As shown in FIG. 1, the damper mechanism 8 is arranged in proximity to the back surface (right side in the drawing) of the turbine runner 5 so as to be located between the turbine runner 5 and the lock-up piston 90. The damper mechanism 8 according to the embodiment includes a drive member 80 that serves as an input element, an intermediate member (intermediate element) 83 that is engaged with the drive member 80 via a plurality of first coil springs (first elastic bodies) 81 and a driven plate (output element) 84 that is engaged with the intermediate member 83 via a plurality of second coil springs (second elastic bodies) 82 that are arranged so as to be spaced apart from the first coil springs 81 in the radial direction of the fluid transmission apparatus 1. The drive member 80 has a plurality of spring contact portions that are fitted (fixed) to the outer peripheral portion of the lock-up piston 90 of the lock-up clutch mechanism 9 and that are respectively in contact with one ends of the corresponding first coil springs 81. The plurality of first coil springs 81 are slidably supported at predetermined intervals in the circumferential direction by a spring support member 11 supported rotatably around the axis of the fluid transmission apparatus 1, and are arranged in the outer peripheral side region of a housing inner space defined by the front cover 3 and the pump shell 40 of the pump impeller 4. In addition, the plurality of second coil springs 82 each have a stiffness (spring constant) higher than that of each first coil spring 81, and are slidably held at predetermined intervals in the circumferential direction by the intermediate member 83 on the radially inner side of the first coil springs 81.

The intermediate member 83 of the damper mechanism 8 is formed of an annular first intermediate plate 831 that is arranged on the front cover 3-side and an annular second intermediate plate 832 that is arranged on the turbine runner 5-side and that is fixed to the first intermediate plate 831 via rivets. The first intermediate plate 831 has a plurality of first spring contact portions at its outer peripheral side. The plurality of first spring contact portions are respectively in contact with the other ends of the corresponding first coil springs 81. The first intermediate plate 831 has a plurality of second spring support portions at its inner peripheral side for the purpose of holding the second coil springs 82. The second intermediate plate 832 has second spring support portions that respectively face the second spring support portions of the first intermediate plate 831 to hold the second coil springs 82. Then, at least one of the first and second intermediate plates 831 and 832 has a plurality of spring contact portions that are respectively in contact with one ends of the corresponding second coil springs 82. The driven plate 84 is arranged between the first intermediate plate 831 and the second intermediate plate 832, and is fixed to the radially extended portion 7a of the damper hub 7 via rivets together with the turbine shell 50 of the turbine runner 5.

The lock-up clutch mechanism 9 is able to carry out lockup where the front cover 3 is coupled to the damper hub 7 via the damper mechanism 8 and is able to cancel the lockup. In the embodiment, as shown in FIG. 1, the lock-up piston 90 of the lock-up clutch mechanism 9 is arranged inside the front cover 3 and near the inner wall surface, on the engine side (right side in the drawing), of the front cover 3, and is fitted to a piston support portion 7b, which is formed at the right end of the damper hub 7 in the drawing, so as to be slidable in the axial direction and rotatable with respect to the piston support portion 7b. In addition, a friction material 91 is stuck to the outer peripheral side surface, on the front cover 3-side, of the lock-up piston 90. Then, a lock-up chamber 95 is defined between the back surface (right side surface in the drawing) of the lock-up piston 90 and the front cover 3. The lock-up chamber 95 is connected to a hydraulic control unit (not shown) via a hydraulic oil supply hole (not shown) and an oil passage (not shown) that is formed in the input shaft.

When power is transmitted between the pump impeller 4 and the turbine runner 5 without carrying out lockup by the lock-up clutch mechanism 9, hydraulic oil supplied to the pump impeller 4 and the turbine runner 5 flows into the lock-up chamber 95, and the lock-up chamber 95 is filled with the hydraulic oil. Thus, at this time, the lock-up piston 90 is not moved toward the front cover 3, so the lock-up piston 90 is not frictionally engaged with the front cover 3. In addition, when the pressure inside the lock-up chamber 95 is reduced by the hydraulic control unit (not shown), the lock-up piston 90 is moved toward the front cover 3 due to the pressure difference to thereby be frictionally engaged with the front cover 3. Thus, the front cover 3 is coupled to the damper hub 7 via the damper mechanism 8, and, accordingly, power from the engine is transmitted to the input shaft of the transmission via the front cover 3, the damper mechanism 8 and the damper hub 7. Note that, when reducing the pressure inside the lock-up chamber 95 is stopped, the lock-up piston 90 separates from the front cover 3 due to reduction in pressure difference resulting from the flow of hydraulic oil into the lock-up chamber 95. Thus, lockup is cancelled.

Here, in the above fluid transmission apparatus 1, when lockup is carried out at the time when the rotational speed of the engine coupled to the front cover 3 has reached an extremely low lock-up rotational speed Nlup, that is, for example, about 1000 rpm, power transmission efficiency between the engine and the transmission is improved to thereby make it possible to further improve the fuel economy of the engine. Therefore, in order to favorably damp vibrations generated in a path from the front cover (input member) 3 to the damper hub (output member) 7 when the rotational speed of the front cover 3 (engine rotational speed) is around an extremely low predetermined lock-up rotational speed Nlup, the fluid transmission apparatus 1 according to the embodiment includes a dynamic damper 10 and a centrifugal pendulum vibration absorber 20.

In the embodiment, the dynamic damper 10 is formed of the spring support member 11 and a plurality of coil springs (third elastic bodies) 100. The spring support member 11 supports the first coil springs 81 that are arranged on the radially most outer side among the first and second coil springs 81 and 82 that constitute the damper mechanism 8 in the outer peripheral side region of the housing inner space defined by the front cover 3 and the pump shell 40 of the pump impeller 4. That is, in the fluid transmission apparatus 1 according to the embodiment, the support portion for the first coil springs 81 on the radially outer side, which is generally formed integrally with the drive member 80 or the lock-up piston 90, is separated from the drive member 80, or the like, and is formed as the independent spring support member 11. Then, in the embodiment, the spring support member 11 is supported rotatably around the axis of the fluid transmission apparatus 1, and is used also as the mass body of the dynamic damper 10.

As shown in FIG. 1, the spring support member 11 according to the embodiment is an annular member that is formed so as to slidably hold the first coil springs 81 by surrounding about half of the outer periphery of each of the first coil springs 81, and has a plurality of spring contact portions 11a that respectively extend inward in the radial direction and that are respectively in contact with one ends of the corresponding coil springs 100. Furthermore, a plurality of protrusions 11b that extend in the axial direction of the fluid transmission apparatus 1 are formed on the back surface, on the turbine runner 5-side (left side in the drawing), of the spring support member 11. The inner peripheral surfaces of the protrusions 11b of the spring support member 11 are slidably supported by a disc-shaped support plate 12 that is fixed to the back surface, on the front cover 3-side (right side in the drawing), of the turbine runner 5 so as to be perpendicular to the axial direction of the fluid transmission apparatus 1. Thus, the spring support member 11 according to the embodiment is supported rotatably about the axis of the fluid transmission apparatus 1 by the turbine runner 5. In this way, when the spring support member 11 is supported rotatably around the axis of the fluid transmission apparatus 1 by the turbine runner 5, the first coil springs 81 of the damper mechanism 8 may be supported by the spring support member 11, in a region near the outer peripheral end of the turbine runner 5, which tends to be a dead space, so the inertia of the spring support member 11 may be further increased, and the size of the fluid transmission apparatus 1 overall may be reduced.

In addition, the plurality of coil springs 100 that constitute the dynamic damper 10 each are slidably supported (held) at predetermined intervals in the circumferential direction by the intermediate member 83, between the first coil springs 81 and second coil springs 82 of the damper mechanism 8 when viewed in the axial direction of the fluid transmission apparatus 1. That is, the first intermediate plate 831 that constitutes the intermediate member 83 according to the embodiment has a plurality of axially extended portions 831a that respectively extend from between the contact portions, which are in contact with the first coil springs 81 on the radially outer side, and the second spring support portions on the radially inner side when viewed in the axial direction of the fluid transmission apparatus 1 toward the turbine runner 5 (left side in the drawing) in the axial direction. Furthermore, the second intermediate plate 832 that constitutes the intermediate member 83 has a plurality of spring retaining portions 832a that are formed on the radially outer sides of the second spring support portions so as to overlap with the axially extended portions 831a of the first intermediate plate 831 with respect to the axial direction when viewed in the radial direction of the fluid transmission apparatus 1. Then, the plurality of coil springs 100 are respectively held by the axially extended portions 831a of the first intermediate plate 831 and the spring retaining portions 832a of the second intermediate plate 832, and overlap with the first and second coil springs 81 and 82 of the damper mechanism 8 with respect to the axial direction when viewed in the radial direction of the fluid transmission apparatus 1.

In this way, by supporting the coil springs 100 of the dynamic damper 10 by the intermediate member 83, between the first coil springs 81 and second coil springs 82 of the damper mechanism 8 when viewed in the axial direction of the fluid transmission apparatus 1, members and spaces required for supporting the coil springs 100 of the dynamic damper 10 are reduced to thereby make it possible to further reduce the size of the fluid transmission apparatus 1 overall. In addition, by arranging the first and second coil springs 81 and 82 of the damper mechanism 8 and the coil springs 100 of the dynamic damper 10 such that the first and second coil springs 81 and 82 and the coil springs 100 overlap each other with respect to the axial direction when viewed in the radial direction of the fluid transmission apparatus 1, the axial length of the fluid transmission apparatus 1 is reduced to thereby make it possible to reduce the size of the apparatus overall.

One end of each of the coil springs 100 held by the intermediate member 83 is in contact with (is engaged with) a corresponding one of the spring contact portions 11a of the spring support member 11 as described above, and the other end of each of the coil springs 100 held by the intermediate member 83 is in contact with (is engaged with) a corresponding one of the plurality of spring contact portions 84a formed at the outer peripheral portion of the driven plate 84 that is the output element of the damper mechanism 8. Thus, in the fluid transmission apparatus 1 according to the embodiment, the dynamic damper 10 is connected to the driven plate 84 that is the output element of the damper mechanism 8. Note that, in the embodiment, as shown in FIG. 1, the plurality of axially extended portions 831a of the first intermediate plate 831 are formed so that the respective end surfaces (end surfaces at the left side in the drawing) are contactable with the spring support member 11 that is rotatably supported by the turbine runner 5. Thus, it is possible to restrict movement of the spring support member 11 in the axial direction by the axially extended portions 831a.

Figure 2:
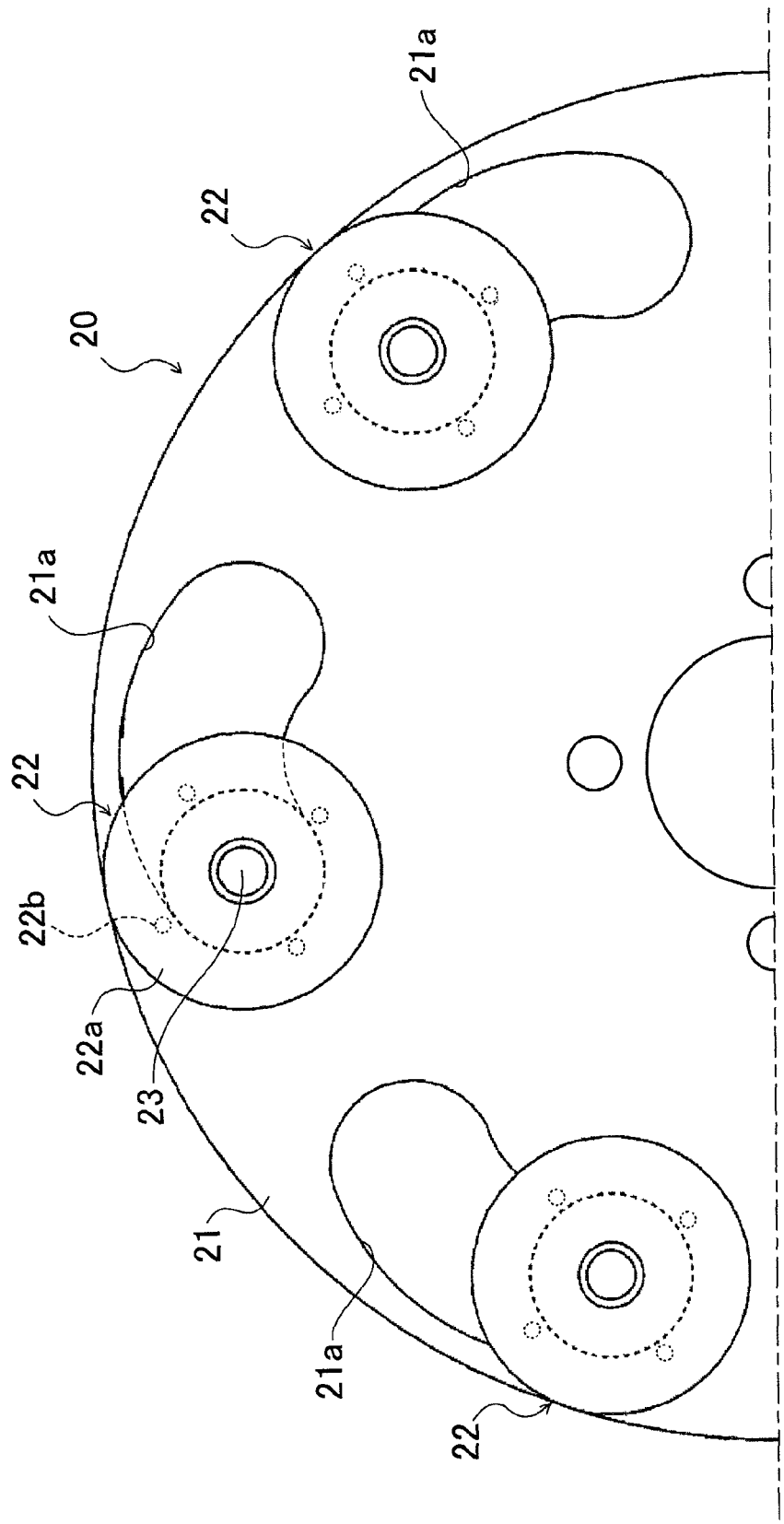
FIG. 2 is a structure diagram that shows a centrifugal pendulum vibration absorber 20 of the fluid transmission apparatus 1.

As shown in FIG. 1 and FIG. 2, the centrifugal pendulum vibration absorber 20 includes an annular support member 21 that is coupled to the damper mechanism 8 and a plurality of mass bodies 22 that are oscillatable with respect to the support member 21. The support member 21 according to the embodiment has a plurality of guide holes 21a, which are arc-shaped oblong holes, at equiangular intervals as shown in FIG. 2. In addition, each of the mass bodies 22 according to the embodiment is formed of two disc-shaped metal plates 22a and a support shaft 23. The support shaft 23 is rollably inserted in the guide hole 21a of the support member 21, and the metal plates 22a are fixed to both ends of the support shaft 23. Furthermore, a plurality of (four in the embodiment) minute protrusions 22b are formed on the surface of each metal plate 22a, facing the support member 21, so as to extend toward the support member 21 in order to suppress a slide between the surface overall and the support member 21.

Then, the centrifugal pendulum vibration absorber 20 according to the embodiment is arranged inside the lock-up piston 90 so that the damper mechanism 8 is located between the centrifugal pendulum vibration absorber 20 and the turbine runner 5 and is fixed to the intermediate member 83 of the damper mechanism. That is, the support member 21 of the centrifugal pendulum vibration absorber 20 according to the embodiment is fixed to the inner peripheral portion of the first intermediate plate 831 of the intermediate member 83 via rivets, on the radially inner side of the second coil springs 82 that are arranged on the radially inner side among the first and second coil springs 81 and 82 of the damper mechanism 8. Note that, as shown in FIG. 1, the damper hub 7 has a cylindrical aligning portion 7c that is located between the radially extended portion 7a and the piston support portion 7b. At the time of assembling the centrifugal pendulum vibration absorber 20, a spacer (jig) (not shown) is fitted to the aligning portion 7c of the damper hub 7 and the first intermediate plate 831 and the support member 21 of the centrifugal pendulum vibration absorber 20 are fitted to the spacer, the first intermediate plate 831 and the support member 21 of the centrifugal pendulum vibration absorber 20 are fixed by rivets, and then the spacer is removed. Thus, it is possible to fix the centrifugal pendulum vibration absorber 20 to the intermediate member 83 of the damper mechanism 8 while the centrifugal pendulum vibration absorber 20 is aligned around the axis of the fluid transmission apparatus 1 with high accuracy.

As described above, when the support member 21 of the centrifugal pendulum vibration absorber 20 is fixed to the intermediate member 83 on the radially inner side of the second coil springs 82 of the damper mechanism 8, a larger arrangement space for the centrifugal pendulum vibration absorber 20 is ensured to thereby make it possible to further increase the flexibility of selection of the size (radial length) of each mass body 22 of the centrifugal pendulum vibration absorber 20. In addition, in the fluid transmission apparatus 1 according to the embodiment, the first and second coil springs 81 and 82 of the damper mechanism 8 and the coil springs 100 of the dynamic damper 10 are arranged between the turbine runner 5 and the centrifugal pendulum vibration absorber 20 when viewed in the radial direction of the fluid transmission apparatus 1, the arrangement space for the centrifugal pendulum vibration absorber 20 is sufficiently ensured while suppressing an increase in the size of the fluid transmission apparatus 1 to thereby make it possible to increase the flexibility of selection of the size (radial length) of each mass body 22 of the centrifugal pendulum vibration absorber 20.

Next, the operation of the above described fluid transmission apparatus 1 will be described with reference to FIG. 3.

Figure 3:
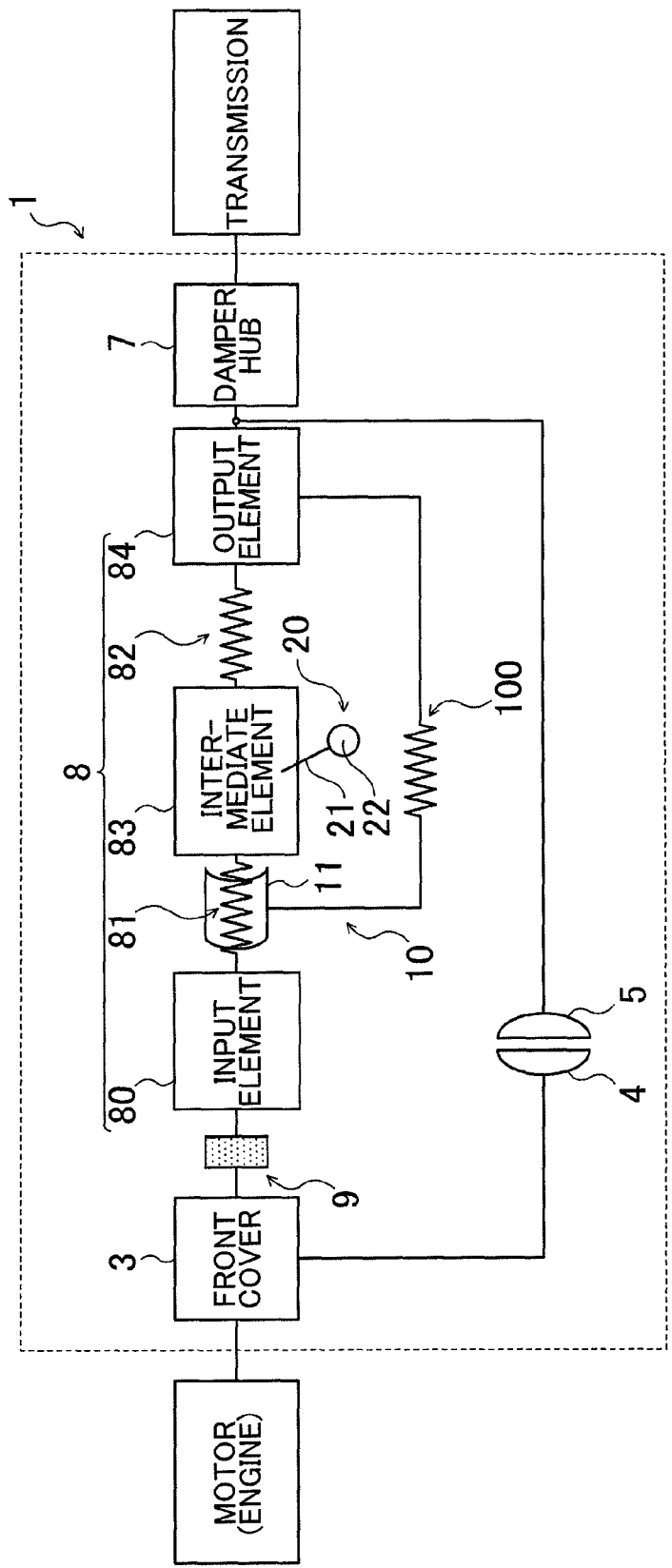
FIG. 3 is a schematic block diagram of the fluid transmission apparatus 1.

As is apparent from FIG. 3, during lockup cancellation where the front cover 3 is not coupled to the damper hub 7 via the damper mechanism 8 by the lock-up clutch mechanism 9, power from the engine that serves as a motor is transmitted to the input shaft of the transmission via a path formed of the front cover 3, the pump impeller 4, the turbine runner 5 and the damper hub 7. On the other hand, during lockup where the front cover 3 is coupled to the damper hub 7 via the damper mechanism 8 by the lock-up clutch mechanism 9, as is apparent from FIG. 3, power from the engine that serves as a motor is transmitted to the input shaft of the transmission via a path formed of the front cover 3, the lock-up clutch mechanism 9, the drive member 80, the first coil springs 81, the intermediate member 83, the second coil springs 82, the driven plate 84 and the damper hub 7. At this time, fluctuations in torque input into the front cover 3 are absorbed mainly by the first and second coil springs 81 and 82 of the damper mechanism 8.

In addition to the above damper mechanism 8, during lockup, the plurality of coil springs 100 that are engaged with the spring support member 11 and the driven plate 84 of the damper mechanism 8 constitute the dynamic damper 10 together with the spring support member 11, and it is possible to effectively absorb (damp) vibrations, transmitted from the engine side to the front cover 3, from the driven plate 84 of the damper mechanism 8 with the dynamic damper 10. Furthermore, in the fluid transmission apparatus 1 according to the embodiment, as the damper mechanism 8 coupled to the front cover 3 by the lock-up piston 90 in accordance with lockup rotates together with the front cover 3, the support member 21 coupled to the intermediate member 83 of the damper mechanism 8 also rotates around the axis of the fluid transmission apparatus 1 together with the intermediate member 83. With the rotation of the support member 21, the support shafts 23 of the mass bodies 22 that constitute the centrifugal pendulum vibration absorber 20 are guided by the respective guide holes 21a of the support member 21 to roll between one ends and the other ends of the corresponding guide holes 21a. Thus, the mass bodies 22 each oscillate with respect to the support member 21. Thus, vibrations opposite in phase to vibrations (resonance) of the intermediate member 83 are applied from the centrifugal pendulum vibration absorber 20 to the intermediate member 83 of the damper mechanism 8 to thereby make it possible to absorb (damp) vibrations transmitted to the front cover 3 with the centrifugal pendulum vibration absorber 20 as well.

Thus, in the fluid transmission apparatus 1 according to the embodiment, by adjusting the stiffness (spring constant) of each coil spring 100, the weight (inertia) of the spring support member 11, and the like, which define the vibration damping characteristic (resonant frequency) of the dynamic damper 10, the size (particularly, the radial length) and weight of each mass body 22, the shape and dimensions of each guide hole 21a, and the like, which define the vibration damping characteristic of the centrifugal pendulum vibration absorber 20, on the basis of the number of cylinders of the engine that serves as a motor and the lock-up rotational speed Nlup at which lockup is carried out, even when lockup is carried out when the rotational speed of the engine is extremely low like, for example, 1000 rpm, vibrations transmitted from the engine that serves as a motor to the fluid transmission apparatus 1, that is, the front cover 3, are effectively absorbed (damped) by the dynamic damper 10 and the centrifugal pendulum vibration absorber 20 to thereby make it possible to favorably suppress transmission of the vibrations to the damper hub 7 via the driven plate 84. Then, with the fluid transmission apparatus 1, it is possible to improve the power transmission efficiency and, consequently, it is possible to improve the fuel economy of the engine, by carrying out lockup at the time when the rotational speed of the engine has reached the lock-up rotational speed Nlup that is relatively low like, for example, about 1000 rpm.

As described above, in the fluid transmission apparatus 1 according to the embodiment, the spring support member 11 that is supported rotatably around the axis of the fluid transmission apparatus 1 and that supports the first coil springs 81 of the damper mechanism 8 is used as the mass body of the dynamic damper 10. In this way, when the independent spring support member 11 that supports the first coil springs 81 of the damper mechanism 8 is supported rotatably around the axis of the fluid transmission apparatus 1 and the spring support member 11 is used also as the mass body of the dynamic damper 10, it is not necessary to use a mass body exclusive for the dynamic damper, so it is possible to reduce the size of the fluid transmission apparatus 1. In addition, the spring support member 11 is an independent member and is not directly related to transmission of power unlike the turbine runner 5, so the spring support member 11 is hard to be subjected to constraints of the size, weight, arrangement location, and the like, as compared with the member like the turbine runner 5. Thus, by using the spring support member 11 as the mass body of the dynamic damper 10, it is possible to easily adjust the characteristic of the dynamic damper 10. As a result, in the fluid transmission apparatus 1 according to the embodiment, it is possible to easily adjust the characteristic of the dynamic damper 10 while reducing the size of the apparatus overall.

In addition, in the embodiment, the spring support member 11 is arranged in the outer peripheral side region inside the housing of the fluid transmission apparatus 1 to support the first coil springs 81 that are arranged on the radially most outer side among the first and second coil springs 81 and 82 of the damper mechanism 8. Thus, in the fluid transmission apparatus 1, the inertia of the spring support member 11 may be further increased, so an increase in the size or weight of the spring support member 11 may be suppressed. Therefore, it is possible to reduce the size and weight of the fluid transmission apparatus 1.

Furthermore, the spring support member 11 according to the embodiment is an annular member that is formed so as to slidably hold the first coil springs 81 of the damper mechanism 8, and is supported rotatably around the axis of the fluid transmission apparatus 1 by the turbine runner 5. Thus, in the fluid transmission apparatus 1, the first coil springs 81 of the damper mechanism 8 may be supported by the spring support member 11 in a region near the outer peripheral end of the turbine runner 5, which tends to be a dead space, so the inertia of the spring support member 11 may be further increased, and the size of the fluid transmission apparatus 1 overall may be reduced.

In addition, in the fluid transmission apparatus 1 according to the embodiment, the coil springs 100 of the dynamic damper 10 are supported by the intermediate member 83, between the first coil springs 81 and second coil springs 82 of the damper mechanism 8 when viewed in the axial direction of the fluid transmission apparatus 1. Thus, members and spaces required for supporting the coil springs 100 of the dynamic damper 10 may be reduced, so it is possible to further reduce the size of the fluid transmission apparatus 1 overall. In addition, in the fluid transmission apparatus 1 according to the embodiment, the first and second coil springs 81 and 82 of the damper mechanism 8 and the coil springs 100 of the dynamic damper 10 are arranged between the turbine runner 5 and the centrifugal pendulum vibration absorber 20 when viewed in the radial direction of the fluid transmission apparatus 1, the arrangement space for the centrifugal pendulum vibration absorber 20 is sufficiently ensured while suppressing an increase in the size of the fluid transmission apparatus 1 to thereby make it possible to increase the flexibility of selection of the size (radial length) of each mass body 22 of the centrifugal pendulum vibration absorber 20.

Furthermore, the intermediate member 83 of the damper mechanism 8 according to the embodiment has the axially extended portions 831a. The axially extended portions 831a extend in the axial direction of the fluid transmission apparatus 1 and support the coil springs 100 of the dynamic damper 10, and are contactable with the spring support member 11. Thus, it is possible to support the coil springs 100 of the dynamic damper 10 by the axially extended portions 831a and to restrict movement of the spring support member 11 in the axial direction. In addition, in the fluid transmission apparatus 1 according to the embodiment, the support member 21 of the centrifugal pendulum vibration absorber 20 is fixed to the intermediate member 83 of the damper mechanism 8 on the radially inner side of the second coil springs 82 that are arranged on the radially inner side among the first and second coil springs 81 and 82 of the damper mechanism 8. Thus, a larger arrangement space for the centrifugal pendulum vibration absorber 20 is ensured to thereby make it possible to further increase the flexibility of selection of the size (radial length) of each mass body 22 of the centrifugal pendulum vibration absorber 20.

Figure 4:
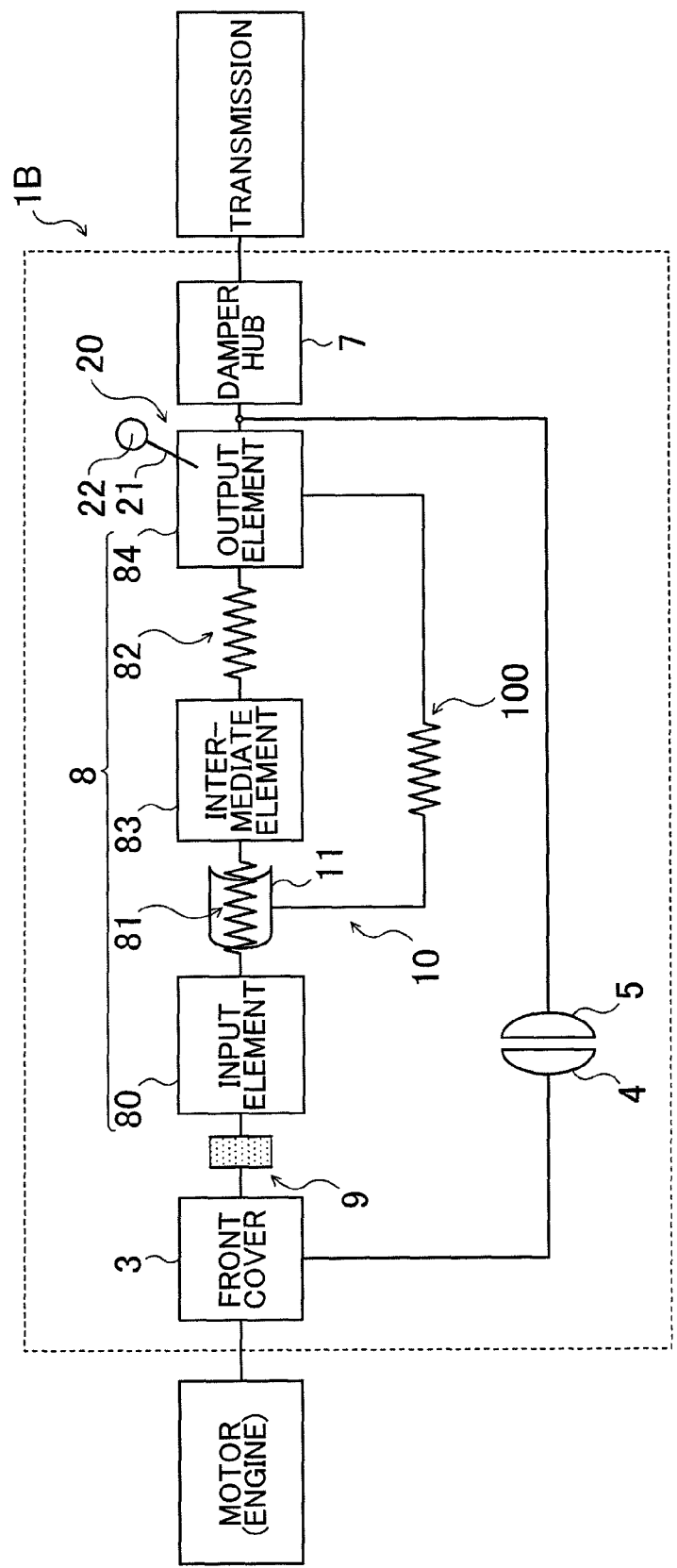
FIG. 4 is a schematic block diagram of a fluid transmission apparatus 1B according to an alternative embodiment.

FIG. 4 is a schematic block diagram of a fluid transmission apparatus 1B according to an alternative embodiment. Note that, in order to avoid overlap description, the same reference numerals are assigned to the same components among the components of the fluid transmission apparatus 1B as the components of the above described fluid transmission apparatus 1, and the illustration and detailed description thereof are omitted.

Figure 5:
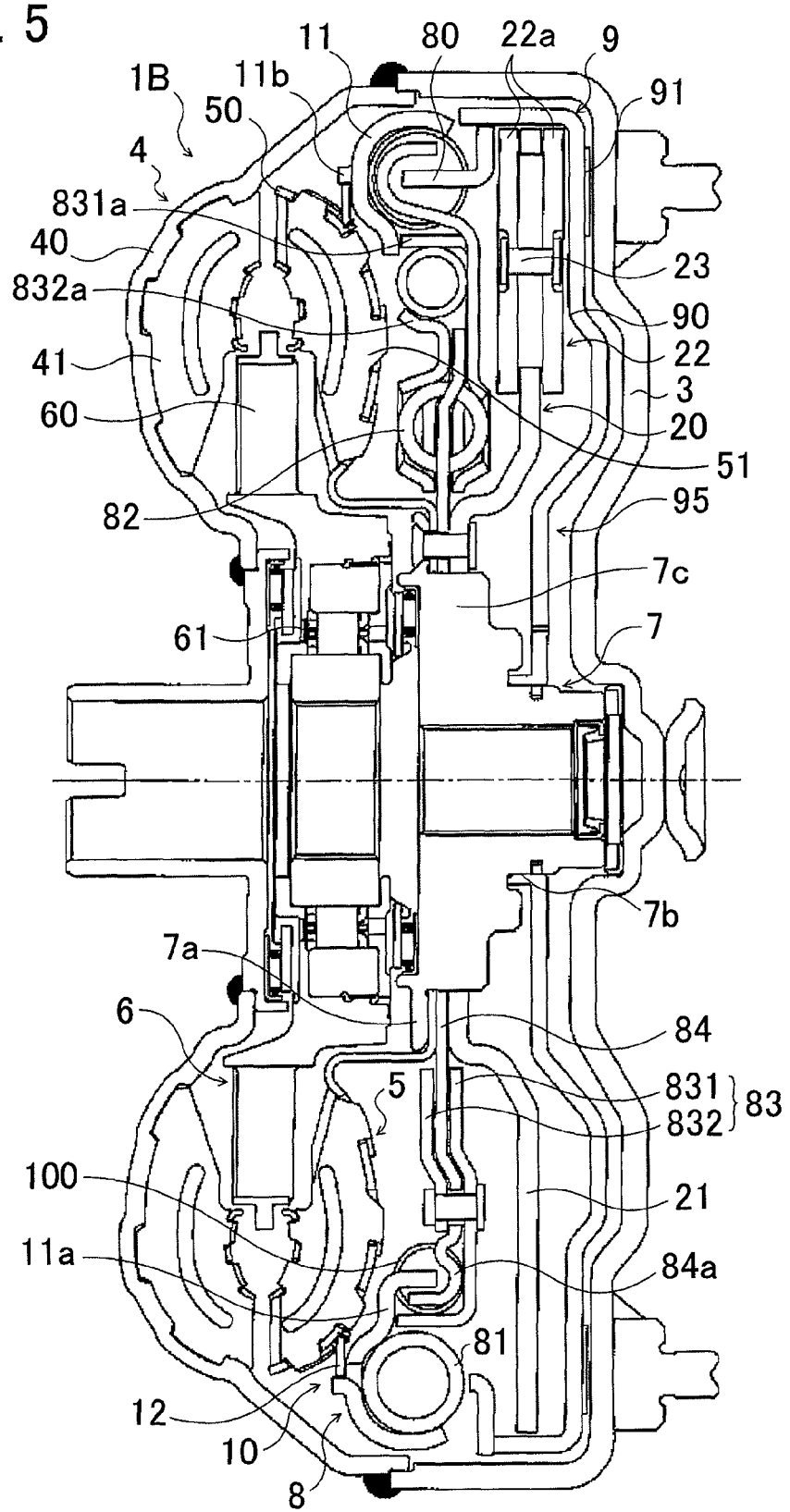
FIG. 5 is a structure diagram that shows the fluid transmission apparatus 1B.

In the fluid transmission apparatus 1B shown in the drawing, the coil springs 100 of the dynamic damper 10 are engaged with the driven plate 84, which is the output element of the damper mechanism 8, (and the damper hub 7), and the support member 21 of the centrifugal pendulum vibration absorber 20 is connected to the driven plate 84 of the damper mechanism 8 (and the damper hub 7). That is, the fluid transmission apparatus 1B corresponds to the one obtained by fixing the support member 21 of the centrifugal pendulum vibration absorber 20 to the driven plate 84, which is the output element of the damper mechanism 8, (damper hub 7), as shown in FIG. 5, instead of fixing the support member 21 of the centrifugal pendulum vibration absorber 20 to the intermediate member 83 (first intermediate plate 831) of the damper mechanism 8 in the fluid transmission apparatus 1 shown in FIG. 1, and the like. In the example of FIG. 5, the inner peripheral portion of the support member 21 of the centrifugal pendulum vibration absorber 20 is offset in the axial direction with respect to the outer peripheral portion toward the turbine runner 5 by pressing, or the like, and the inner peripheral portion of the support member 21 is fixed to the radially extended portion 7a of the damper hub 7 via rivets together with the turbine shell 50 of the turbine runner 5 and the driven plate 84.

In the thus structured fluid transmission apparatus 1B, during lockup, the plurality of coil springs 100 that are engaged with the spring support member 11 and the driven plate 84 of the damper mechanism 8 constitute the dynamic damper 10 together with the spring support member 11, so it is possible to effectively absorb (damp) vibrations, transmitted from the motor side to the front cover 3, from the driven plate 84 of the damper mechanism 8 with the dynamic damper 10. In addition, in the fluid transmission apparatus 1B, as the damper mechanism 8 coupled to the front cover 3 by the lock-up piston 90 in accordance with lockup rotates together with the front cover 3, the support member 21 coupled to the driven plate 84 of the damper mechanism 8 (the damper hub 7) also rotates around the axis of the fluid transmission apparatus 1 together with the driven plate 84. With the rotation of the support member 21, the support shafts 23 of the mass bodies 22 that constitute the centrifugal pendulum vibration absorber 20 are guided by the respective guide holes 21a of the support member 21 to roll between one ends and the other ends of the corresponding guide holes 21a. Thus, the mass bodies 22 each oscillate with respect to the support member 21. Thus, vibrations opposite in phase to vibrations (resonance) of the driven plate 84 are applied from the centrifugal pendulum vibration absorber 20 to the driven plate 84 of the damper mechanism 8 to thereby make it possible to absorb (damp) vibrations transmitted to the front cover 3 with the centrifugal pendulum vibration absorber 20 as well.

Figure 6:
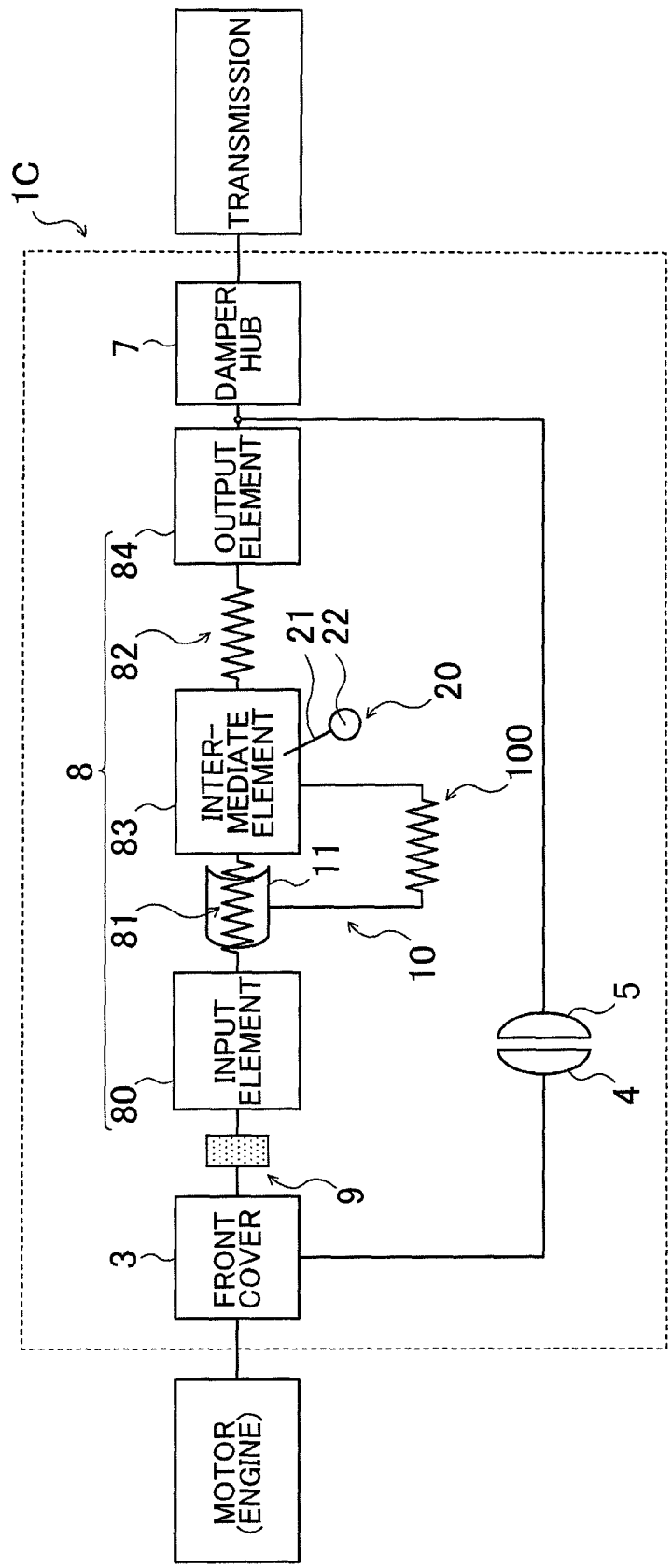
FIG. 6 is a schematic block diagram of a fluid transmission apparatus 1C according to another alternative embodiment.

FIG. 6 is a schematic block diagram of a fluid transmission apparatus 1C according to another alternative embodiment. Note that, in order to avoid overlap description, the same reference numerals are assigned to the same components among the components of the fluid transmission apparatus 1C as the components of the above described fluid transmission apparatus 1, and the illustration and detailed description thereof are omitted.

Figure 7:
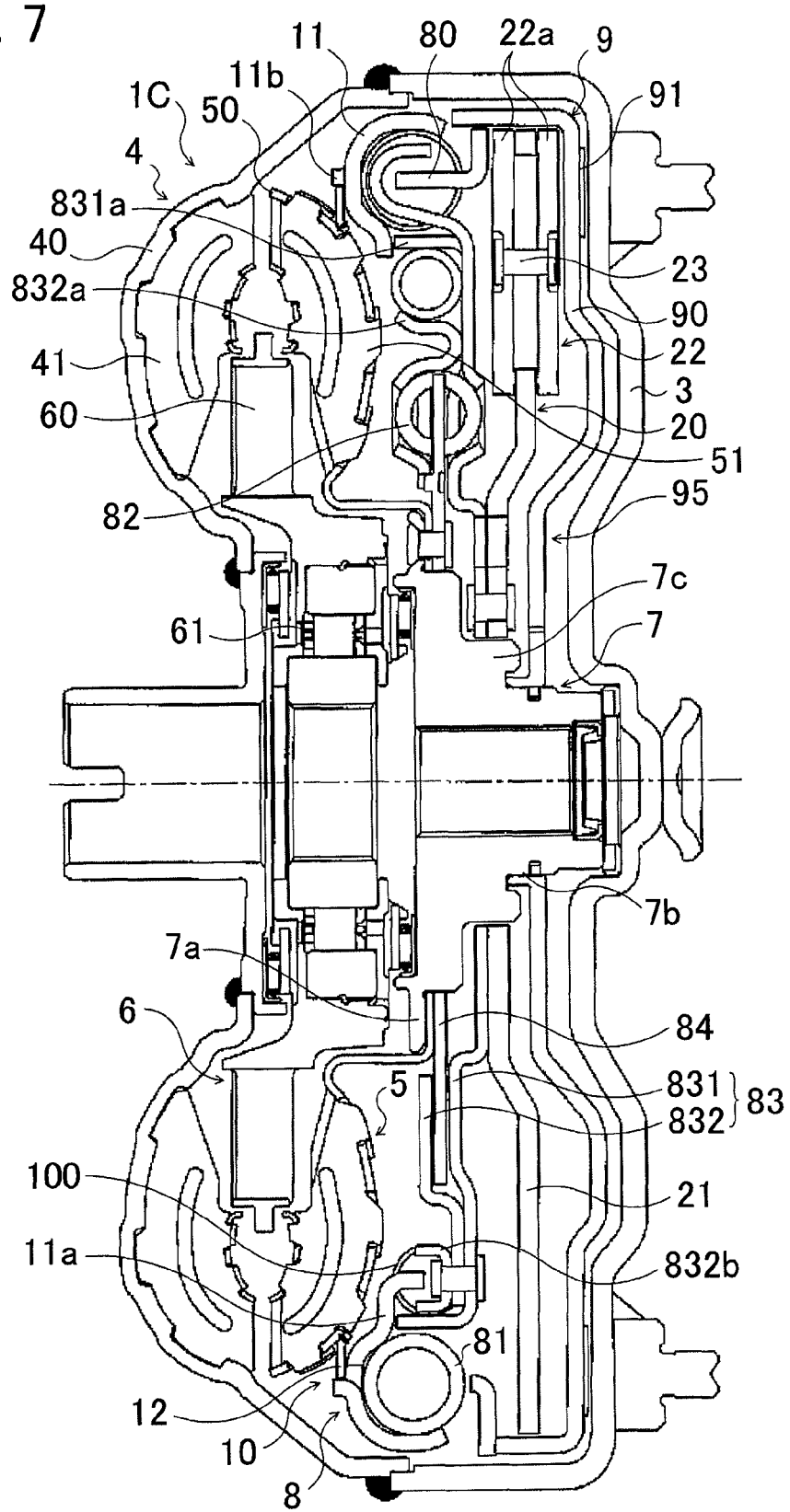
FIG. 7 is a structure diagram that shows the fluid transmission apparatus 1C.

In the fluid transmission apparatus 1C shown in the drawing, the coil springs 100 of the dynamic damper 10 are engaged with the intermediate member (intermediate element) 83 of the damper mechanism 8, and the support member 21 of the centrifugal pendulum vibration absorber 20 is connected to the intermediate member 83 of the damper mechanism 8. That is, the fluid transmission apparatus 1C corresponds to the one obtained by bringing (engaging) the other end of each of the coil springs 100 into contact with (with) a corresponding one of the plurality of spring contact portions 832b that are formed in the intermediate member 83 of the damper mechanism 8, as shown in FIG. 7, instead of bringing (engaging) the other end of each of the coil springs 100 of the dynamic damper 10 into contact with (with) a corresponding one of the plurality of spring contact portions 84a that are formed in the driven plate 84 of the damper mechanism 8 in the fluid transmission apparatus 1 shown in FIG. 1, and the like. In the example of FIG. 7, for example, members having a substantially U shape cross section are fixed to the first and second intermediate plates 831 and 832 via rivets to thereby form the plurality of spring contact portions 832b in the intermediate member 83.

In the thus structured fluid transmission apparatus 1C, during lockup, the plurality of coil springs 100 that are engaged with the spring support member 11 and the intermediate member 83 of the damper mechanism 8 constitute the dynamic damper 10 together with the spring support member 11, so it is possible to effectively absorb (damp) vibrations, transmitted from the motor side to the front cover 3, from the intermediate member 83 of the damper mechanism 8 with the dynamic damper 10. In addition, in the fluid transmission apparatus 1C, vibrations opposite in phase to vibrations (resonance) of the intermediate member 83 are applied from the centrifugal pendulum vibration absorber 20 to the intermediate member 83 of the damper mechanism 8 to thereby make it possible to absorb (damp) vibrations transmitted to the front cover 3 with the centrifugal pendulum vibration absorber 20 as well.

Figure 8:
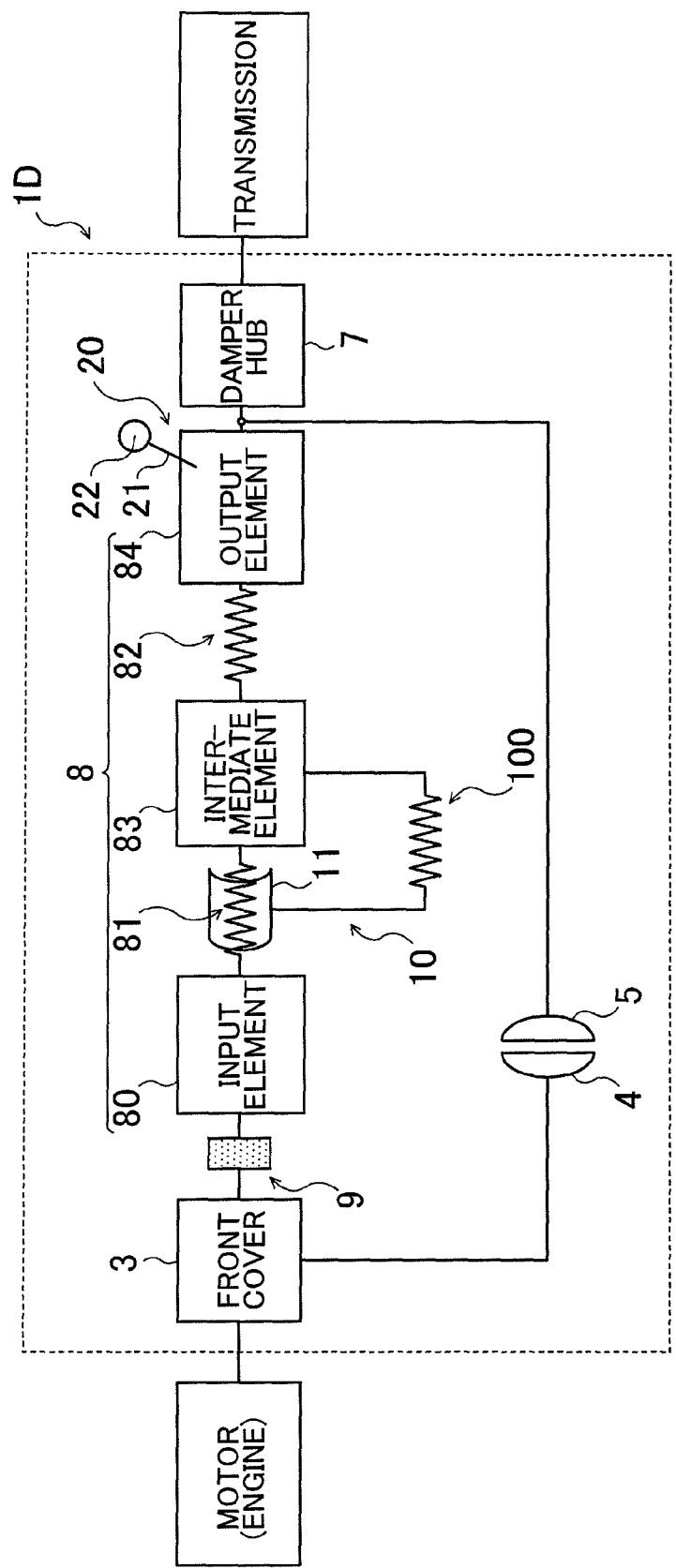
FIG. 8 is a schematic block diagram of a fluid transmission apparatus 1D according to an alternative embodiment.

FIG. 8 is a schematic block diagram of a fluid transmission apparatus 1D according to yet another alternative embodiment. Note that, in order to avoid overlap description, the same reference numerals are assigned to the same components among the components of the fluid transmission apparatus 1D as the components of the above described fluid transmission apparatus 1, and the illustration and detailed description thereof are omitted.

Figure 9:
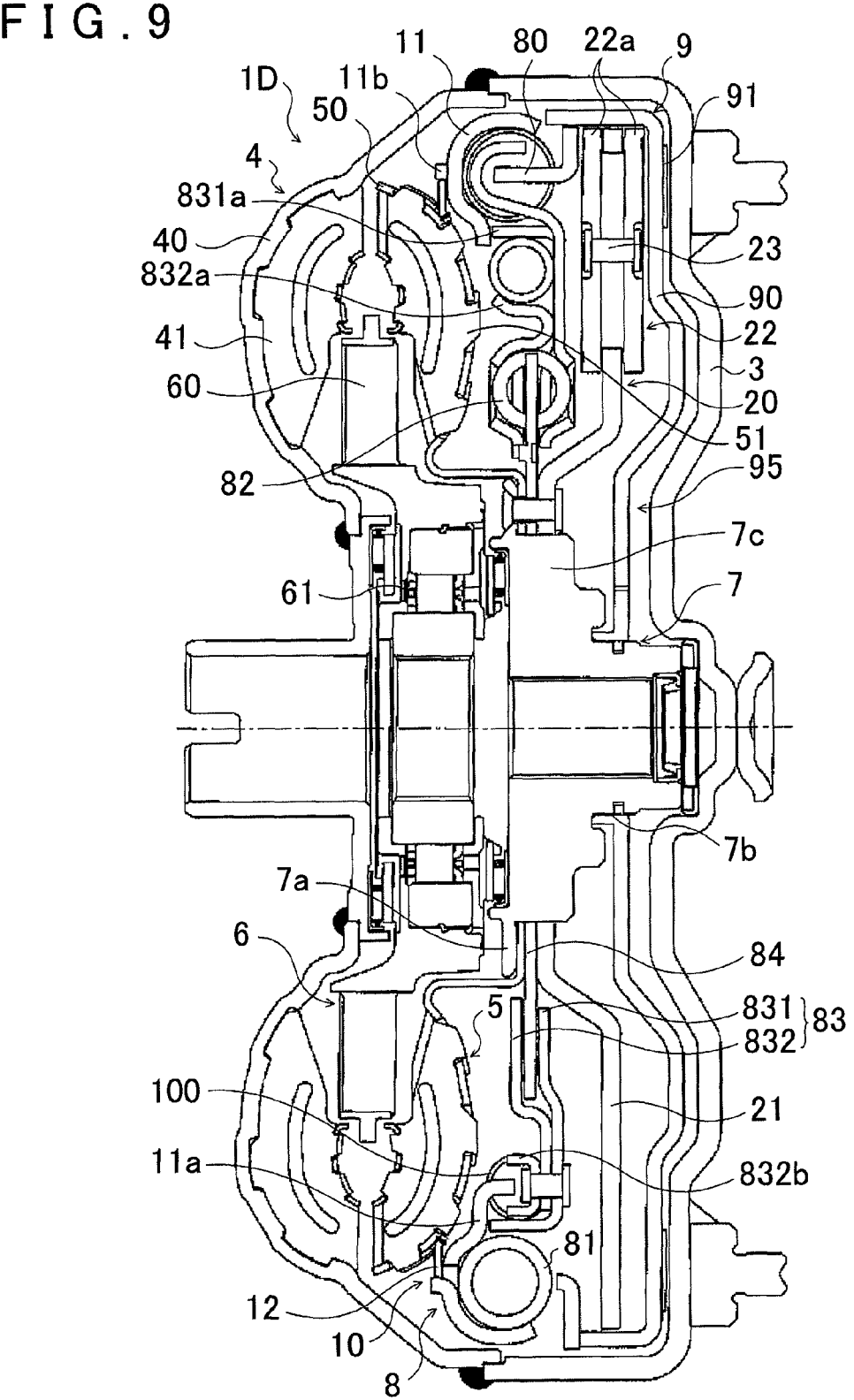
FIG. 9 is a structure diagram that shows yet another fluid transmission apparatus 1D.

In the fluid transmission apparatus 1D shown in the drawing, the coil springs 100 of the dynamic damper 10 are engaged with the intermediate member (intermediate element) 83 of the damper mechanism 8, and the support member 21 of the centrifugal pendulum vibration absorber 20 is connected to the driven plate 84 of the damper mechanism 8 (and the damper hub 7). That is, the fluid transmission apparatus 1D corresponds to the one obtained by fixing the support member 21 of the centrifugal pendulum vibration absorber 20 to the driven plate 84, which is the output element of the damper mechanism 8, (damper hub 7), as shown in FIG. 9, instead of fixing the support member 21 of the centrifugal pendulum vibration absorber 20 to the intermediate member 83 (first intermediate plate 831) of the damper mechanism 8 in the fluid transmission apparatus 1C shown in FIG. 7 and the like. In the example of FIG. 9 as well, the inner peripheral portion of the support member 21 of the centrifugal pendulum vibration absorber 20 is offset in the axial direction with respect to the outer peripheral portion by pressing, or the like, and the inner peripheral portion of the support member 21 is fixed to the radially extended portion 7a of the damper hub 7 via rivets together with the turbine shell 50 of the turbine runner 5 and the driven plate 84.

In the thus structured fluid transmission apparatus 1D, during lockup, the plurality of coil springs 100 that are engaged with the spring support member 11 and the intermediate member 83 of the damper mechanism 8 constitute the dynamic damper 10 together with the spring support member 11, so it is possible to effectively absorb (damp) vibrations, transmitted from the motor side to the front cover 3, from the intermediate member 83 of the damper mechanism 8 with the dynamic damper 10. In addition, in the fluid transmission apparatus 1D, vibrations opposite in phase to vibrations (resonance) of the driven plate 84 are applied from the centrifugal pendulum vibration absorber 20 to the driven plate 84 of the damper mechanism 8 to thereby make it possible to absorb (damp) vibrations transmitted to the front cover 3 with the centrifugal pendulum vibration absorber 20 as well.

FIG. 10 is an explanatory graph that illustrates the correlation between the rotational speed of the engine, which serves as a motor, and the vibration level of each of the fluid transmission apparatuses 1, 1B, 1C and 1D. The graph illustrates the correlation between the rotational speed of the engine (front cover 3) and the vibration level in a path of each fluid transmission apparatus from the front cover 3 to the damper hub 7 in the fluid transmission apparatuses 1, 1B, 1C and 1D. The correlation was obtained through simulations of a torsional vibration system conducted in order to obtain a fluid transmission apparatus suitable for combination with cylinder-saving (few-cylinder) engines, such as a three-cylinder engine or a four-cylinder engine, that generate relatively large vibrations. In the above simulations, the specifications of the engine that serves as a motor and the specifications of the pump impeller 4, turbine runner 5, damper mechanism 8 and lock-up clutch mechanism 9 were basically the same, the mass (inertia) of the spring support member 11, and the like, and the stiffness of each of the coil springs 100, the spring support member 11 and the coil springs 100 constituting the dynamic damper 10, and the sizes and weights of the support member 21 and each mass body 22 of the centrifugal pendulum vibration absorber 20 were also basically the same.

Here, during lockup of the lock-up clutch mechanism 9, vibrations input from the engine into the front cover 3 are transmitted to the input element (drive member 80) of the damper mechanism 8 almost no damping, so, when a cylinder-saving engine is set as an object, even when at least any one of the dynamic damper 10 and the centrifugal pendulum vibration absorber 20 is connected to the input element (drive member 80) of the damper mechanism 8, there is a concern that a sufficient vibration damping effect brought by the dynamic damper 10 and the centrifugal pendulum vibration absorber 20 may not be obtained. Therefore, here, the above simulations were conducted over the above described fluid transmission apparatuses 1, 1B, 1C and 1D in which the intermediate member (intermediate element) 83 and driven plate (output element) 84 of the damper mechanism 8 are set as objects to which the dynamic damper 10 and the centrifugal pendulum vibration absorber 20 are coupled. In FIG. 10, the solid line indicates the vibration level of the fluid transmission apparatus 1 shown in FIG. 1, and the like, the alternate long and short dashes line indicates the vibration level of the fluid transmission apparatus 1B shown in FIG. 4 and FIG. 5, the alternate long and two short dashes line indicates the vibration level of the fluid transmission apparatus 1C shown in FIG. 6 and FIG. 7, the broken line indicates the vibration level of the fluid transmission apparatus 1D shown in FIG. 8 and FIG. 9, and the dotted line indicates the vibration level of a fluid transmission apparatus obtained by omitting the dynamic damper 10 and the centrifugal pendulum vibration absorber 20 from the fluid transmission apparatus 1 according to the above embodiment.

As is apparent from FIG. 10, in the fluid transmission apparatuses 1 and 1B in which the dynamic damper 10 is connected to the driven plate 84, which is the output element of the damper mechanism 8 (and the damper hub 7), the mass of the damper mechanism 8 increases as a whole, so the resonant frequency of the damper mechanism 8 decreases and, as a result, the resonance point of the damper mechanism 8 shifts toward a lower rotational speed side as compared with the other fluid transmission apparatuses 1C and 1D. Thus, in the fluid transmission apparatuses 1 and 1B, the resonance point of the dynamic damper 10 may be shifted away from the resonance point of the damper mechanism 8. Thus, it is possible to further effectively damp vibrations transmitted from the engine to the front cover 3 with the dynamic damper 10 in a range in which the rotational speed of the engine (front cover) is low, that is, around the lock-up rotational speed Nlup determined at a lower value in terms of efficiency.

In addition, when the fluid transmission apparatus 1 is compared with the fluid transmission apparatus 1B, in the fluid transmission apparatus 1 in which the centrifugal pendulum vibration absorber 20 is connected to the intermediate member 83 of the damper mechanism 8, it is possible to further effectively suppress the resonance of the damper mechanism 8 overall by suppressing, using the centrifugal pendulum vibration absorber 20, vibrations of the intermediate member 83 that is interposed between the first coil springs 81 and the second coil springs 82 and, therefore, vibrates the most among the elements of the damper mechanism 8. As indicated by the solid line in FIG. 10, it is possible to also suppress the resonance of the dynamic damper 10, that is, vibrations (the peak of waveform after vibrations are damped) that occur as vibrations are damped by the dynamic damper 10, by the amount by which the resonance of the damper mechanism 8 overall is suppressed. In contrast to this, in the fluid transmission apparatus 1B in which the centrifugal pendulum vibration absorber 20 is connected to the driven plate 84 of the damper mechanism 8, the resonance of the dynamic damper 10, that is, vibrations that occur as vibrations are damped by the dynamic damper 10, slightly increase by the amount by which the level of suppression of the resonance of the damper mechanism 8 overall is lower than that of the fluid transmission apparatus 1; however, the resonance of the dynamic damper 10 may be further quickly converged by the centrifugal pendulum vibration absorber 20, so it is possible to more quickly converge the vibrations of the system overall in a path from the front cover 3 to the damper hub 7, that is, formed of the damper mechanism 8, the dynamic damper 10 and the centrifugal pendulum vibration absorber 20 as compared with the fluid transmission apparatus 1.

Furthermore, in the fluid transmission apparatuses 1C and 1D in which the dynamic damper 10 is connected to the intermediate member 83 of the damper mechanism 8, the resonance level of the damper mechanism 8 overall is high as compared with the fluid transmission apparatuses 1 and 1B in which the centrifugal pendulum vibration absorber 20 is connected to the intermediate member 83 of the damper mechanism 8; however, the resonance point of the dynamic damper 10 shifts toward a lower rotational speed side by connecting the dynamic damper 10 to the intermediate member 83 of the damper mechanism 8, so it is possible to quickly converge the vibrations of the system overall in a path from the front cover 3 to the damper hub 7, that is, formed of the damper mechanism 8, the dynamic damper 10 and the centrifugal pendulum vibration absorber 20.

In addition, when the fluid transmission apparatus 1C is compared with the fluid transmission apparatus 1D, in the fluid transmission apparatus 1C in which the centrifugal pendulum vibration absorber 20 is connected to the intermediate member 83 of the damper mechanism 8, it is possible to further effectively suppress the resonance of the damper mechanism 8 overall by suppressing, using the centrifugal pendulum vibration absorber 20, vibrations of the intermediate member 83 that is interposed between the first coil springs 81 and the second coil springs 82 and, therefore, vibrates the most among the elements of the damper mechanism 8. As indicated by the alternate long and two short dashes line in FIG. 10, it is possible to suppress also the resonance of the dynamic damper 10, that is, vibrations (the peak of waveform after vibrations are damped) that occur as vibrations are damped by the dynamic damper 10, by the amount by which the resonance of the damper mechanism 8 overall is suppressed. In contrast to this, in the fluid transmission apparatus 1D in which the centrifugal pendulum vibration absorber 20 is connected to the driven plate 84 of the damper mechanism 8, the resonance of the dynamic damper 10, that is, vibrations that occur as vibrations are damped by the dynamic damper 10, slightly increase by the amount by which the level of suppression of the resonance of the damper mechanism 8 overall is lower than that of the fluid transmission apparatus 1C; however, the resonance of the dynamic damper 10 may be further quickly converged by the centrifugal pendulum vibration absorber 20, so it is possible to more quickly converge the vibrations of the system overall in a path from the front cover 3 to the damper hub 7, that is, formed of the damper mechanism 8, the dynamic damper 10 and the centrifugal pendulum vibration absorber 20 as compared with the fluid transmission apparatus 1C.

In either case, in the above described fluid transmission apparatuses 1, 1B, 1C and 1D, the dynamic damper 10 and the centrifugal pendulum vibration absorber 20 are connected to the damper mechanism 8 independently (parallel), so it is possible to further effectively damp vibrations transmitted to the front cover 3 with the dynamic damper 10 and the centrifugal pendulum vibration absorber 20 by suppressing occurrence of the situation where the vibration damping effect brought by the dynamic damper 10 and the vibration damping effect brought by the centrifugal pendulum vibration absorber 20 cancel each other. That is, when the dynamic damper 10 is connected to one of the intermediate member 83 and driven plate 84 of the damper mechanism 8 and the centrifugal pendulum vibration absorber 20 is connected to the other one of the intermediate member 83 and the driven plate 84 or when the dynamic damper 10 and the centrifugal pendulum vibration absorber 20 are connected to any one of the intermediate member 83 and driven plate 84 of the damper mechanism 8, it is possible to obtain a fluid transmission apparatus suitable for combination with a cylinder-saving engine.

Note that the above described spring support member 11 may be supported rotatably by another member, that is, the front cover 3 or the pump shell 40, instead of being rotatably supported by the turbine runner 5. In addition, the above described fluid transmission apparatuses 1, 1B, 1C and 1D each include the damper mechanism 8 that has multiples types of elastic bodies, that is, the first and second coil springs 81 and 82 and the intermediate member 83; instead, the fluid transmission apparatus according to the present invention may include a damper mechanism that has multiple types of elastic bodies but no intermediate member (intermediate element) or may include a damper mechanism that has only single type (one type) of elastic bodies. Furthermore, the above described fluid transmission apparatuses 1, 1B, 1C and 1D each are structured as a torque converter that includes the pump impeller 4, the turbine runner 5 and the stator 6; instead, the fluid transmission apparatus according to the present invention may be structured as a fluid coupling that includes no stator or may be structured as a starting apparatus that includes no pump impeller 4, turbine runner 5 or stator 6. In addition, the fluid transmission apparatus according to the present invention may include a friction-type multiple disc lock-up clutch mechanism instead of the friction-type single disc lock-up clutch mechanism 9. Furthermore, the structure of the centrifugal pendulum vibration absorber in the present invention is not limited to the structure of the above described centrifugal pendulum vibration absorber 20.

Here, the correlation between major elements of the above embodiment, and the like, and major elements of the invention described in summary of the invention will be explained. That is, in the embodiment, and the like, the front cover 3 that is coupled to the engine that serves as a motor corresponds to "input member", the damper mechanism 8 that includes the drive member 80 that serves as an input element, the first and second coil springs 81 and 82 and the driven plate 84 that serves as an output element corresponds to "damper mechanism", the lock-up clutch mechanism 9 that is able to carry out lockup where the front cover 3 is coupled via the damper mechanism 8 to the damper hub 7 connected to the input shaft of the transmission and is able to cancel the lockup corresponds to "lock-up clutch mechanism", the dynamic damper 10 that is formed of the coil springs 100 and the spring support member 11 that serves as a mass body engaged with the coil springs 100 corresponds to "dynamic damper", and the spring support member 11 that is supported rotatably around the axis of the fluid transmission apparatus 1 and that supports the first coil springs 81 of the damper mechanism 8 corresponds to "elastic body support member". In addition, the centrifugal pendulum vibration absorber 20 that includes the support member 21 and the plurality of mass bodies 22 each oscillatable with respect to the support member 21 corresponds to "centrifugal pendulum vibration absorber".

However, the correlation between the major elements of the embodiment and the major elements of the invention described in summary of the invention is one example for specifically explaining a mode in which the embodiment carries out the invention described in summary of the invention, so the correlation does not intend to limit the elements of the invention described in summary of the invention. That is, the embodiment is just one specific example of the invention described in summary of the invention, and the interpretation of the invention described in summary of the invention should be made on the basis of the description itself.

The mode for carrying out the present invention is described above with reference to the embodiment; however, the present invention is not limited to the above embodiment, and, of course, may be modified into various forms without departing from the scope of the present invention.

The present invention is usable in the manufacturing field, or the like, of a starting apparatus.

What is claimed is:

1. A starting apparatus that comprising:
an input member that is coupled to a motor;
a damper mechanism that has an input element, a first elastic body and an output element;
a lock-up clutch mechanism that carries out lockup where the input member is coupled to an input shaft of a transmission via the damper mechanism and that is able to cancel the lockup; and
a dynamic damper that includes a contact portion connected by a second elastic body to a mass body, the second elastic body not being a portion of the damper mechanism that forms a torque transmission pass from the input member to the input shaft when the lock-up clutch mechanism is engaged, and the contact portion is directly connected to the damper mechanism, wherein
the mass body of the dynamic damper is an elastic body support member that is supported rotatably around an axis of the starting apparatus and that supports the first elastic body of the damper mechanism, the mass body being coupled to the damper mechanism by the second elastic body.

2. The starting apparatus according to claim 1, wherein the elastic body support member is arranged in an outer peripheral side region inside a housing of the starting apparatus.

3. The starting apparatus according to claim 1, wherein the damper mechanism has elastic bodies, which are arranged so as to be spaced apart in a radial direction of the starting apparatus, as the first elastic body, and the elastic body support member supports a portion of the elastic bodies arranged on a radially most outer side among the elastic bodies.

4. The starting apparatus according to claim 3, wherein the elastic body support member is an annular member that is formed so as to slidably hold the first elastic body of the damper mechanism, and is supported rotatably around the axis of the starting apparatus by the turbine runner.

5. The starting apparatus according to claim 1, wherein the damper mechanism includes a third elastic body arranged so as to be spaced apart from the first elastic body in a radial direction of the starting apparatus and engaged with the output element, and includes an intermediate element engaged with the first elastic body and the third elastic body, and
the second elastic body of the dynamic damper is supported by the intermediate element between the first elastic body and the third elastic body of the damper mechanism when viewed in an axial direction of the starting apparatus.

6. The starting apparatus according to claim 5, further comprising:
a centrifugal pendulum vibration absorber that includes a support member connected to the intermediate element or output element of the damper mechanism and a plurality of mass bodies each oscillatable with respect to the support member, wherein
the second elastic body of the dynamic damper is engaged with the output element of the damper mechanism, and
the first and third elastic bodies of the damper mechanism and the second elastic body of the dynamic damper are arranged between the turbine runner and the centrifugal pendulum vibration absorber when viewed in the radial direction.

7. The starting apparatus according to claim 5, further comprising:
a centrifugal pendulum vibration absorber that includes a support member connected to the intermediate element or output element of the damper mechanism and a plurality of mass bodies each oscillatable with respect to the support member, wherein
the second elastic body of the dynamic damper is engaged with the intermediate element of the damper mechanism, and
the first and third elastic bodies of the damper mechanism and the second elastic body of the dynamic damper are arranged between the turbine runner and the centrifugal pendulum vibration absorber when viewed in the radial direction.

8. The starting apparatus according to claim 6, wherein the intermediate element of the damper mechanism has an axially extended portion that extends in the axial direction and that supports the second elastic body of the dynamic damper, and that is contactable with the elastic body support member.

9. The starting apparatus according to claim 6, wherein the support member of the centrifugal pendulum vibration absorber is fixed to the intermediate element or output element of the damper mechanism on a radially inner side of one of the first and third elastic bodies of the damper mechanism, the one of the third and fourth elastic bodies being arranged on a radially inner side among the third and fourth elastic bodies.

10. The starting apparatus according to claim 1, further comprising:
a pump impeller that is connected to the input member; and
a turbine runner that is rotatable together with the pump impeller.

11. The starting apparatus according to claim 2, wherein the damper mechanism has elastic bodies, which are arranged so as to be spaced apart in a radial direction of the starting apparatus, as the first elastic body, and
the elastic body support member supports a portion of the elastic bodies arranged on a radially most outer side among the elastic bodies.

12. The starting apparatus according to claim 11, wherein the elastic body support member is an annular member that is formed so as to slidably hold the first elastic body of the damper mechanism, and is supported rotatably around the axis of the starting apparatus by the turbine runner.

13. The starting apparatus according to claim 12, wherein the damper mechanism includes a third elastic body arranged so as to be spaced apart from the first elastic body in a radial direction of the starting apparatus and engaged with the output element, and includes an intermediate element engaged with the third elastic body and the fourth elastic body, and
the second elastic body of the dynamic damper is supported by the intermediate element between the first elastic body and third elastic body of the damper mechanism when viewed in an axial direction of the starting apparatus.

14. The starting apparatus according to claim 13, further comprising:
a centrifugal pendulum vibration absorber that includes a support member connected to the intermediate element or output element of the damper mechanism and a plurality of mass bodies each oscillatable with respect to the support member, wherein
the second elastic body of the dynamic damper is engaged with the output element of the damper mechanism, and
the first, second, and third elastic bodies are arranged between the turbine runner and the centrifugal pendulum vibration absorber when viewed in the radial direction.

15. The starting apparatus according to claim 13, further comprising:
a centrifugal pendulum vibration absorber that includes a support member connected to the intermediate element or output element of the damper mechanism and a plurality of mass bodies each oscillatable with respect to the support member, wherein
the second elastic body of the dynamic damper is engaged with the intermediate element of the damper mechanism, and
the first and third elastic bodies of the damper mechanism and the second elastic body of the dynamic damper are arranged between the turbine runner and the centrifugal pendulum vibration absorber when viewed in the radial direction.

16. The starting apparatus according to claim 14, wherein the intermediate element of the damper mechanism has an axially extended portion that extends in the axial direction and that supports the second elastic body of the dynamic damper, and that is contactable with the elastic body support member.

17. The starting apparatus according to claim 16, wherein the support member of the centrifugal pendulum vibration absorber is fixed to the intermediate element or output element of the damper mechanism on a radially inner side of one of the first and third elastic bodies of the damper mechanism, the one of the third and fourth elastic bodies being arranged on a radially inner side among the third and fourth elastic bodies.

18. The starting apparatus according to claim 17, further comprising:
a pump impeller that is connected to the input member; and
a turbine runner that is rotatable together with the pump impeller.

19. The starting apparatus according to claim 1, wherein the contact portion is directly connected to the output element.

20. The starting apparatus according to claim 1, wherein the damper mechanism further comprises a third elastic body and an intermediate element, the first elastic body connecting the input element to the intermediate element and the third elastic body connecting the intermediate element to the output element,
wherein the contact portion is connected to the intermediate element.

* * * * *